United States Patent [19]

Peterson et al.

[11] Patent Number: 5,027,850
[45] Date of Patent: Jul. 2, 1991

[54] DEBRIS ARRESTOR FOR VALVE BLEED HOLE

[75] Inventors: Gerald E. Peterson, Riverside; Gregory B. Holcomb, Diamond Bar; James W. Zimmerman, Walnut, all of Calif.

[73] Assignee: The Toro Company, Minneapolis, Minn.

[21] Appl. No.: 537,911

[22] Filed: Jun. 13, 1990

[51] Int. Cl.⁵ .................. F16K 7/17; F16K 51/00
[52] U.S. Cl. ...................... 137/242; 15/246; 24/711.1; 92/96; 137/245; 251/61.1; 411/340; 411/908
[58] Field of Search ............ 137/242, 244, 245, 245.5; 15/246; 222/148, 149, 150, 151; 239/104, 114, 117, 118, 123; 251/30.01, 30.02, 30.03, 30.04, 30.05, 45, 46, 39, 33, 61, 61.1; 24/711.1; 206/345, 346, 347; 92/96; 411/340, 345, 908

[56] References Cited

U.S. PATENT DOCUMENTS

| | | | |
|---|---|---|---|
| 207,482 | 8/1878 | Blessing | 137/245 |
| 1,501,331 | 7/1924 | Gulick | 137/245 |
| 3,254,664 | 6/1966 | Delaney et al. | 251/331 |
| 3,400,731 | 9/1968 | McCornack | 137/245 |
| 3,444,597 | 5/1969 | Bone | 24/711.1 |
| 3,763,881 | 10/1973 | Jones | 251/45 |
| 4,050,473 | 9/1977 | Cho | 137/244 |
| 4,105,186 | 8/1978 | Eby | 251/30.02 |
| 4,301,992 | 11/1981 | Karbo | 251/30.02 |
| 4,347,932 | 9/1982 | Furutu | 24/711.1 |
| 4,505,450 | 3/1985 | Saarem et al. | 137/244 |
| 4,787,411 | 11/1988 | Moldenhauer | 137/244 |
| 4,911,401 | 3/1990 | Holcomb et al. | 137/315 |

FOREIGN PATENT DOCUMENTS 336124 2/1904 France ................ 251/46

OTHER PUBLICATIONS

Dennison Swiftach System 1000 Operating Instructions & Tags, 9/1989.

Primary Examiner—George L. Walton
Attorney, Agent, or Firm—James W. Miller

[57] ABSTRACT

A fluid flow control valve has a diaphragm for sealing against a valve seat. The diaphragm includes a bleed hole for passing fluid from one side of the diaphragm to the other. A debris arrestor comprising a one-piece flexible tag is inserted into the bleed hole by deforming the tag to pass therethrough. The tag after insertion expands to retain itself in the bleed hole.

17 Claims, 2 Drawing Sheets

DEBRIS ARRESTOR FOR VALVE BLEED HOLE

TECHNICAL FIELD

The present invention relates to a fluid flow control valve having a valve element which closes against a valve seat. More particularly, the present invention relates to a debris arrestor for keeping a bleed hole in the valve element open and free of debris.

BACKGROUND OF THE INVENTION

Fluid flow control valves are known which use flexible diaphragms or diaphragm assemblies for sealing against a valve seat. The diaphragm is often "pressure balanced" so that inlet fluid pressure is seen on both the top and bottom sides of the diaphragm. The valve is opened by releasing fluid pressure from the top side of the diaphragm. This allows the fluid inlet pressure acting on the bottom side of the diaphragm to lift the diaphragm up off the valve seat, thereby opening the valve.

When the valve is to be closed, inlet fluid pressure has to be reintroduced into the pressure chamber located above the diaphragm. A small bleed hole can be placed in the diaphragm for allowing fluid to flow from one side of the diaphragm to the other, i.e. from the bottom to the top side of the diaphragm. Unfortunately, the water or other fluid passing through such valves is seldom "clean". Such water often contains suspended solids, such as grains of sand, which can clog the bleed hole and prevent the valve from functioning properly.

U.S. Pat. No. 3,254,664 to Delany et al shows a diaphragm valve having a bleed hole placed therein. The bleed hole is formed by a deformable hollow sleeve which is placed through a perforation in the diaphragm. At least one side of the sleeve is curled over in place to grip the diaphragm. This is done using a special mandril and punch. The sleeve itself forms the bleed hole.

A pin is then inserted through the bleed hole formed by the sleeve. The pin is retained in place by using a tool to flare the ends of the pin into a tapered fan-like shape. The pin is loosely slidable in the bleed hole and controls the rate of flow therethrough by virtue of its diameter. In addition, the pin can include impeller blades for rotating the pin to help keep the bleed hole clean.

The structure shown in the Delany patent for the bleed hole and pin is relatively cumbersome. For one thing, it requires the use of a separate element, i.e. the hollow sleeve, to form the bleed hole. In addition, various tools and manufacturing steps are required in assembling the components together. For example, at least part of the sleeve has to be curled over to retain it in the diaphragm. Moreover, a portion of the pin has to be flared to retain the pin inside the sleeve. These steps are all relatively difficult and time-consuming to do, especially when dealing with a relatively small bleed hole and pin as may be found in certain valves. This increases the difficulty and cost of manufacturing the valve.

SUMMARY OF THE INVENTION

Accordingly, it is an aspect of this invention to provide an improved fluid flow control valve having a relatively simple debris arrestor for a bleed hole, one which is inexpensive to manufacture and install.

An improved fluid flow control valve according to the present invention has a valve component that includes a bleed hole for allowing fluid pressure to flow from a first side to a second side thereof. A debris arrestor means is received in the bleed hole for helping keep the bleed hole open while not completely closing the bleed hole. The debris arrestor means is at least partially flexible allowing the debris arrestor means to be bent for insertion into the bleed hole.

BRIEF DESCRIPTION OF THE DRAWINGS

The present invention will be described in more detail hereafter, when taken in conjunction with the following drawings, in which like reference numerals refer to like elements throughout.

DETAILED DESCRIPTION

Figure 1:
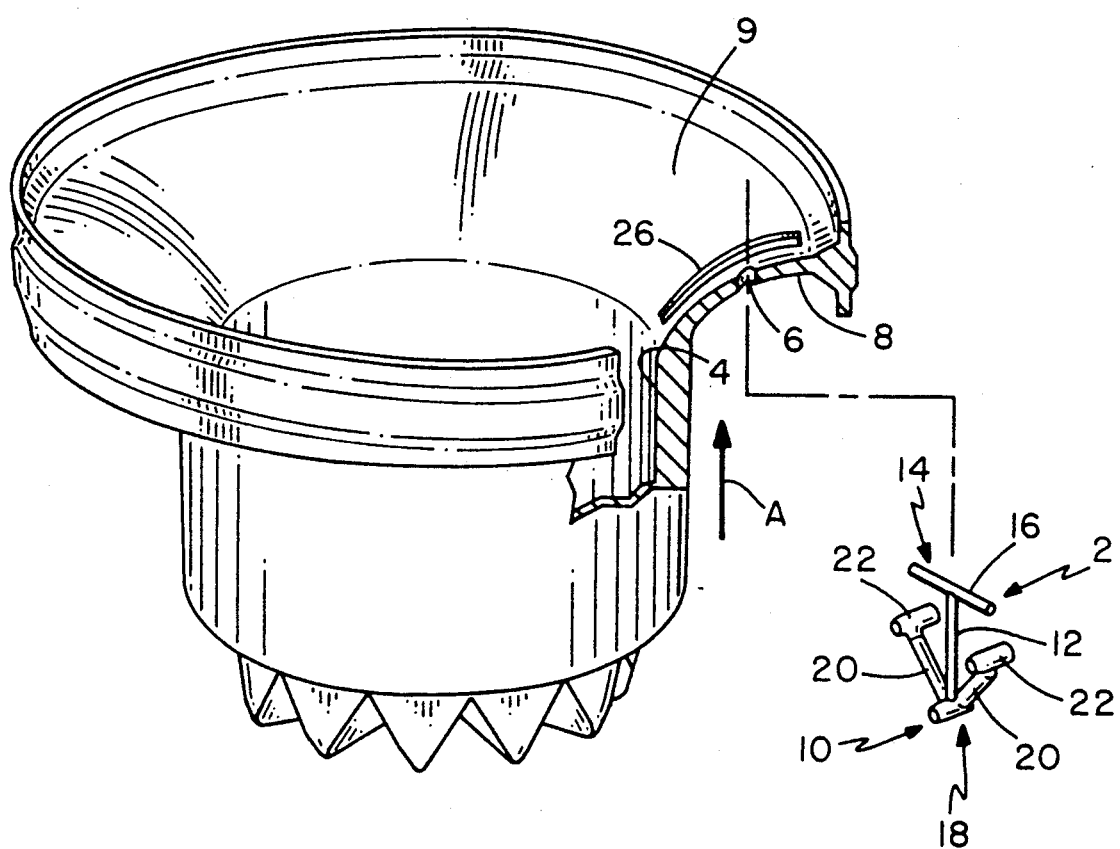
FIG. 1 is a perspective view of a portion of a fluid flow control valve according to the present invention, particularly illustrating the valve element comprising a resilient diaphragm and the debris arrestor which is insertable into a bleed hole in the valve diaphragm.

The present invention relates to an improved debris arrestor, illustrated herein generally as 2, for use in a fluid flow control valve, such as an irrigation valve. This valve typically comprises a pressure balanced valve having a flexible elastomeric diaphragm 4 as the valve element. Diaphragm 4 closes against a valve seat (not shown) for controlling fluid flow through the valve. In addition, diaphragm 4 includes a simple, small bleed hole 6 passing through diaphragm 4. Bleed hole 6 allows fluid to flow from a first side 8 to a second side 9 of diaphragm 4 to equalize pressure on both sides of diaphragm 4.

The valve with which debris arrestor is used will not be described in detail herein as this is unnecessary for an understanding of debris arrestor 2. However, a valve of this type is shown in U.S. Pat. No. 4,911,401 to Holcomb et al, assigned to The Toro Company, the assignee of the present application. This patent is hereby incorporated by reference for teaching the general structure and operation of a valve with which debris arrestor 2 may be used.

Referring first to FIG. 1, debris arrestor 2 preferably comprises a thin, flexible one-piece plastic tag 10. Tag 10 includes an elongated shank 12 having an enlarged head at either end. An upper head 14 is formed by a perpendicular crossmember 16 that, in effect, makes the upper end of tag 10 into a T-shaped stem. A lower head 18 is formed by two upwardly angled flukes 20 at the lower end of shank 12. Flukes 20, in effect, make the lower end of shank 12 into a V-shaped stem. The upper ends of flukes 20 have small horizontal ribs 22 for engaging against diaphragm 4. Overall, the shape of tag 10 somewhat resembles that of an anchor.

Tag 10 is of the same type as that of the small plastic members or clothes tags used to hold a label or price tag on a clothing garment. Such clothes tags are usually H-shaped with the main difference between such tags and tag 10 of the present invention being the configuration of lower head 18, i.e. a V-shaped head 18 here rather than another T-shaped stem. However, the same basic plastic materials are used for tag 10 of the present invention as used for these clothes tags. Tag 10 is formed of a relatively thin plastic material Thus, although the components of tag 10 are integrally joined, tag 10 is still flexible with the various parts being able to bend relative to one another.

Diaphragm 4 and tag 10 are formed separately from one another and are assembled in the following fashion. Upper head 12 of tag 10, i.e. the T-shaped stem thereof, has horizontal crossmember 16 bent downwardly in a suitable fixture or tool until it lies generally along the axis of shank 12. Tag 10 is then inserted upwardly through bleed hole 6 in diaphragm 4, as illustrated by the arrow A, until shank 12 passes into bleed hole 6. Tag 10 is then released from the tool and crossmember 16 springs back to its normal T-shaped configuration. Tag 10 is then permanently retained in bleed hole 6 as shown in FIGS. 2 and 3 hereof, with the T-shaped stem being adjacent top side 9 of diaphragm 4 and the V-shaped stem being adjacent lower side 8 of diaphragm 4.

The use of the V-shaped stem adjacent the lower side of diaphragm 4 is advantageous. The lower side of diaphragm 4 is that side which is continuously open to fluid pressure at the valve inlet. Thus, when the pressure chamber on the upper side of diaphragm 4 is exhausted and begins to refill, the fluid will pass through diaphragm 4 from the lower to the upper sides thereof. If lower head 18 were formed simply by a straight crossmember, as in the case of upper head 12, this crossmember could be forced up against the bottom side of diaphragm 4, blocking off bleed hole 6. However, this is prevented in tag 10 of the present invention as the upwardly pointing angled flukes 20 will engage the bottom side of diaphragm 4 and prevent lower head 18 from bottoming out on that side of diaphragm 4. Flukes 20 may deform somewhat under the force of the fluid pressure, but they will not collapse entirely. Thus, bleed hole 6 is never closed off on the bottom side of diaphragm 4, even when fluid is rushing upwardly past debris arrestor 2.

The presence of debris arrestor 2 in bleed hole 6 helps keep bleed hole 6 open. First, shank 12 of arrestor 2 is sized in a clearance fit with bleed hole 6 to always allow some fluid to pass between shank 12 and bleed hole 6. However, this fit is relatively small, and thus larger sand or dirt particles cannot lodge in the gap between bleed hole 6 and shank 12. In addition, since debris arrestor 2 is free to float up and down in bleed hole 6 under the influence of the fluid pressures in the valve or as diaphragm 4 opens and closes, there will be a cleaning action between shank 12 and bleed hole 6 caused by the relative motion between the two.

Figure 2:
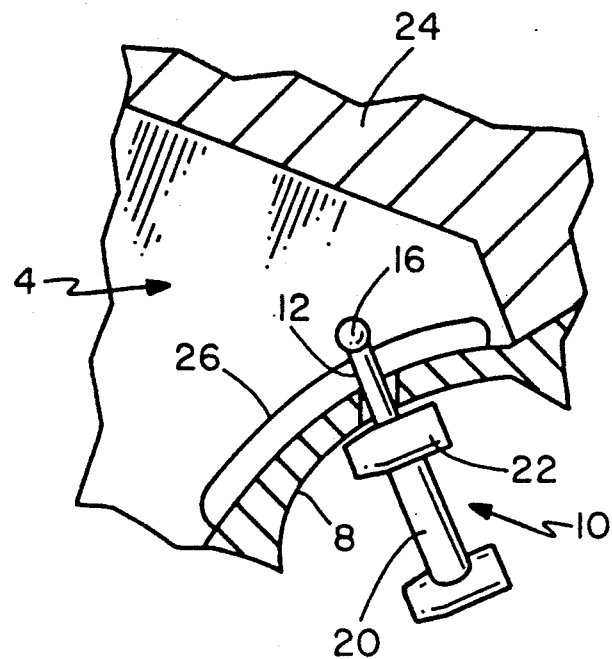
FIG. 2 is a partial cross-sectional view of a valve according to the present invention, particularly illustrating the debris arrestor in place in the diaphragm bleed hole and the valve diaphragm in a closed position.
Figure 3:
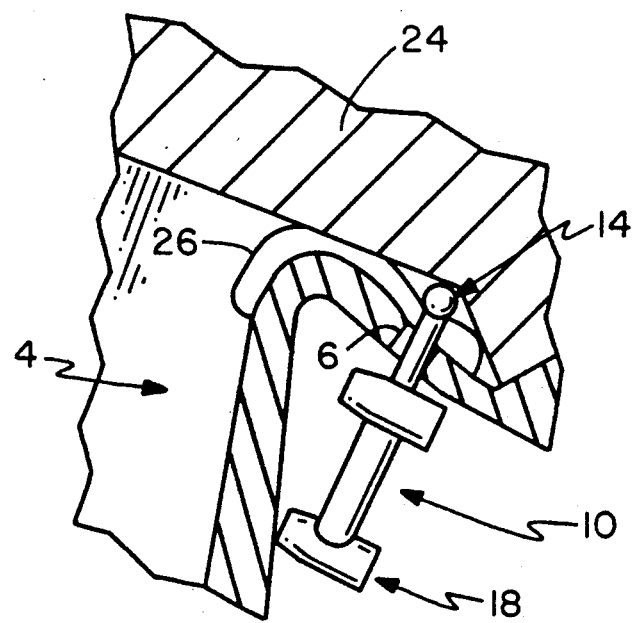
FIG. 3 is a partial cross-sectional view similar to that of FIG. 2, but illustrating the valve diaphragm in an open position deflected up against a wall of the valve body.

Referring to FIG. 2, valve diaphragm 4 is shown in its normally closed position, where pressure is present on both sides of diaphragm 4 and diaphragm 4 is closed against the valve seat. FIG. 3 shows the valve in an opened position, where pressure has been relieved from the top side of diaphragm 4 through a separate bleed assembly described in the aforementioned Holcomb patent. In this open position, diaphragm 4 can sometimes abut against a wall 24 in the valve body as shown in FIG. 3. If this happens, bleed hole 6 could conceivably be closed off on wall 24. This would prevent the valve from reopening as fluid could not then subsequently flow through bleed hole 6 to the upper side of diaphragm 4.

However, diaphragm 4 of the present invention is preferably provided with two spaced ribs 26 located on the top side of diaphragm 4, one rib 26 being located on either side of bleed hole 6. Only a first rib 26 is shown in the drawings. Thus, even when diaphragm 4 is forced up against valve wall 24 as shown in FIG. 3, bleed hole 6 remains open as ribs 26 engage wall 24 and prevent bleed hole 6 from being closed off. See FIG. 3. It would also be possible to achieve much the same effect by removing ribs 24 and using an inverted V-shaped stem as the upper head 14 of debris arrestor 2, i.e. a head where the angled flukes 20 would point downwardly towards the upper side of diaphragm 4. This would also keep bleed hole 6 open from the top side when diaphragm 4 is fully flexed upwardly against wall 24.

Debris arrestor 2 of the present invention has many advantages. First, it helps keep bleed hole 6 open and free of debris during operation of the valve, yet arrestor 2 will not close off bleed hole 6 entirely. It does so while being inexpensive to manufacture and assemble. Bleed hole 6 in diaphragm 4 is a simple hole or perforation molded therein when diaphragm 4 is molded. No separate sleeve is required to form the bleed hole as in the prior art. In addition, debris arrestor 2 is a simple, one piece molded plastic tag that is simply inserted through the hole, deforming to pass through the hole and then expanding to retain itself in the hole. Thus, the present invention provides a valve which is easier and less costly to manufacture.

Various modifications of this invention will be apparent to those skilled in the art. For example, debris arrestor 2 can be used in any bleed hole through which fluid desirably flows in a valve, and not just bleed hole 6 in the particular type of diaphragm 4 shown herein. Thus, the scope of this invention is to be limited only by the appended claims.

We claim:

1. An improved fluid flow control valve of the type having a bleed hole for passing fluid through the bleed hole from a first side to a second side of a valve component, wherein the improvement comprises debris arrestor means received in the bleed hole for helping keep the bleed hole open and free of debris but not completely closing the bleed hole, wherein the debris arrestor means is at least partially flexible allowing the debris arrestor means to be bent for insertion into the bleed hole, wherein the debris arrestor means comprises:
    (a) a shank extending through the bleed hole; and
    (b) laterally extending head means on either end of the shank for preventing the shank from being pulled out of the bleedhole, wherein at least one of the head means is flexible on the shank to allow the head means and shank to be inserted through the bleed hole, the flexible head means after insertion returning to its lateral orientation on the shank to retain the debris arrestor in the bleed hole, and wherein the head located adjacent the first side of the valve component includes means engaging the first side of the valve component for preventing the bleed hole from closing under the force of fluid flowing through the bleed hole from the first side to the second side of the valve component.

2. An improved valve as recited in claim 1, wherein a first one of the lateral head means comprises angled flukes located on the shank to form a V-shaped stem at a first end of the shank, wherein the first lateral head means is adjacent the first side of the valve component, whereby the V-shaped stem on the shank prevent the bleed hole from being closed off despite the force of fluid flowing through the bleed hole.

3. An improved valve as recited in claim 2, wherein a second one of the lateral head means is located substantially perpendicularly to the shank to form a T-shaped stem at a second end of the shank, wherein the second lateral head means is adjacent the second side of the valve component.

4. An improved valve as recited in claim 3, wherein the second lateral head means comprises the flexible head means.

5. An improved valve as recited in claim 4, wherein the debris arrestor means comprises a one-piece plastic tag.

6. An improved valve as recited in claim 4, wherein the valve component comprises a flexible diaphragm that seals against a valve inlet, and further including at least one rib on the diaphragm adjacent the bleed hole and underlying the second lateral head means for preventing the bleed hole from being closed off if the second side of the diaphragm is forced against a wall of the valve.

7. An improved valve as recited in claim 1, wherein one of the lateral head means comprises a crossmember located substantially perpendicularly to the shank to form a T-shaped stem at one end of the shank, and wherein the crossmember is flexible relative to the shank to define the flexible head means.

8. An improved diaphragm valve, which comprises:
(a) a flexible diaphragm having a first side and a second side with a bleed hole formed therein; and
(b) a debris arrestor inserted in the bleed hole for helping keep the bleed hole open and free of debris, wherein the debris arrestor is deformable to allow insertion of the debris arrestor into the bleed hole, the debris arrestor after insertion expanding into a shape sufficient to retain the debris arrestor in the bleed hole, wherein the debris arrestor comprises a tag having a shank passing through the bleed hole and means on either end of the shank for retaining the shank in the bleed hole, and wherein the debris arrestor includes means engaging the first side of the diaphragm for preventing the retaining means from closing the bleed hole when fluid flows through the bleed hole from the first side to the second side of the diaphragm.

9. An improved valve as recited in claim 8, wherein the retaining means comprises laterally extending upper and lower heads on the shank, wherein at least one head is flexible on the shank to be sufficiently deformed to allow insertion through the bleed hole.

10. An improved valve as recited in claim 8, wherein the diaphragm is molded from an elastomeric material, and the bleed hole is molded in the diaphragm.

11. An improved valve as recited in claim 8, wherein the tag is a plastic tag.

12. An improved valve as recited in claim 11, wherein the tag is a one-piece tag.

13. An improved valve as recited in claim 8, wherein the retaining means comprises enlarged heads on each end of the shank with a first head adjacent the first side of the diaphragm and a second head adjacent the second side of the diaphragm, and wherein the first head is shaped to cooperate with the diaphragm to prevent the first head from closing off the bleed hole when fluid flows through the bleed hole from a first side to a second side of the diaphragm.

14. An improved valve for controlling the flow of a liquid of the type having a flow path for liquid flowing between an inlet and an outlet, a valve seat located in the flow path, a flexible diaphragm which is deflectable from a closed orientation in which the diaphragm engages the valve seat to an open orientation in which the diaphragm is lifted off the valve seat to open the valve, wherein a first side of the diaphragm is exposed to fluid pressure at the inlet and a second side of the diaphragm forms a portion of a pressure chamber for receiving fluid pressure from the inlet, and a bleed hole in the diaphragm for bleeding fluid from the first side to the second side thereof to fill the pressure chamber, wherein the improvement relates to a debris arrestor retained in the bleed hole which comprises:
(a) a shank extending through the bleed hole in a clearance fit;
(b) a T-shaped stem at one end of the shank located adjacent the second side of the diaphragm, wherein the T-shaped stem is flexible to allow the T-shaped stem to be deformed and inserted through the bleed hole with the T-shaped stem returning to its original shape after such insertion, whereby the debris arrestor is inserted into the bleed hole by deformation of the T-shaped stem; and
(c) a V-shaped stem at the other end of the shank located adjacent the first side of the diaphragm, wherein the V-shaped stem includes angled flukes which point towards and engages the first side of the diaphragm to prevent the bleed hole from being closed off by the force of fluid flowing from the first to the second side of the diaphragm.

15. An improved valve as recited in claim 14, wherein the T-shaped stem is bendable to allow a head portion of the stem to be bent back along the shank for insertion of the debris arrestor through the bleed hole.

16. An improved valve as recited in claim 14, wherein the debris arrestor comprises a one-piece member.

17. An improved valve as recited in claim 16, wherein the debris arrestor is made of plastic.

* * * * *